US012619785B2

(12) United States Patent
Kyleman et al.

(10) Patent No.: US 12,619,785 B2
(45) Date of Patent: May 5, 2026

(54) SYSTEMS AND METHODS FOR DOCUMENT HIERARCHY PERMISSIONING

(71) Applicant: FutureVault Inc., Toronto (CA)

(72) Inventors: Luke Joseph Kyleman, Toronto (CA); Ka Fu Ko, Mississauga (CA)

(73) Assignee: FutureVault Inc., Toronto (CA)

( * ) Notice: Subject to any disclaimer, the term of this patent is extended or adjusted under 35 U.S.C. 154(b) by 525 days.

(21) Appl. No.: 17/872,965

(22) Filed: Jul. 25, 2022

(65) Prior Publication Data

US 2023/0028302 A1 Jan. 26, 2023

Related U.S. Application Data

(60) Provisional application No. 63/225,659, filed on Jul. 26, 2021.

(51) Int. Cl.
*G06F 21/62* (2013.01)
*G06F 16/16* (2019.01)

(52) U.S. Cl.
CPC .......... *G06F 21/6272* (2013.01); *G06F 16/16* (2019.01)

(58) Field of Classification Search
CPC .... G06F 21/6272; G06F 16/16; G06F 16/355; G06F 16/93; G06F 2221/2141
See application file for complete search history.

(56) References Cited

U.S. PATENT DOCUMENTS

| | | | | |
|---|---|---|---|---|
| 7,941,745 | B2 * | 5/2011 | Marukawa | .............. G06F 16/35 |
| | | | | 715/239 |
| 8,631,504 | B2 * | 1/2014 | Joshi | ................... G06F 21/6272 |
| | | | | 726/28 |
| 10,817,468 | B2 * | 10/2020 | Dudani | .................. G06Q 10/10 |
| 10,884,979 | B2 | 1/2021 | Paterson | |
| 10,984,122 | B2 * | 4/2021 | Thomas | .............. H04L 63/1433 |
| 11,120,056 | B2 | 9/2021 | Paterson | |
| 11,475,074 | B2 | 10/2022 | Paterson | |
| 2008/0154969 | A1 * | 6/2008 | DeBie | ..................... G06F 16/93 |
| 2011/0321154 | A1 * | 12/2011 | Dau | .................... G06F 21/6218 |
| | | | | 726/17 |
| 2016/0357984 | A1 * | 12/2016 | Van Rotterdam | ........................... |
| | | | | G06Q 10/06311 |
| 2023/0195996 | A1 * | 6/2023 | Lorensson | ............ H04L 63/101 |
| | | | | 726/28 |

FOREIGN PATENT DOCUMENTS

WO WO-2016166760 A1 * 10/2016 .......... G06F 16/353

* cited by examiner

*Primary Examiner* — Christopher A Revak
(74) *Attorney, Agent, or Firm* — Nixon Peabody LLP

(57) ABSTRACT

Provided herein are systems, methods, and computer readable media for document hierarchy permissions. This may include providing a permission database comprising a plurality of users, a plurality of advisors, and a plurality of categories. A candidate document is received at a network device. A candidate user, a candidate routing action, and a candidate document category are identified from the candidate document. A candidate document permission attribute is generated identifying the candidate user, candidate file location, and the candidate document category. The candidate document is stored, and the candidate document permission attribute corresponding to the candidate document is stored.

18 Claims, 5 Drawing Sheets

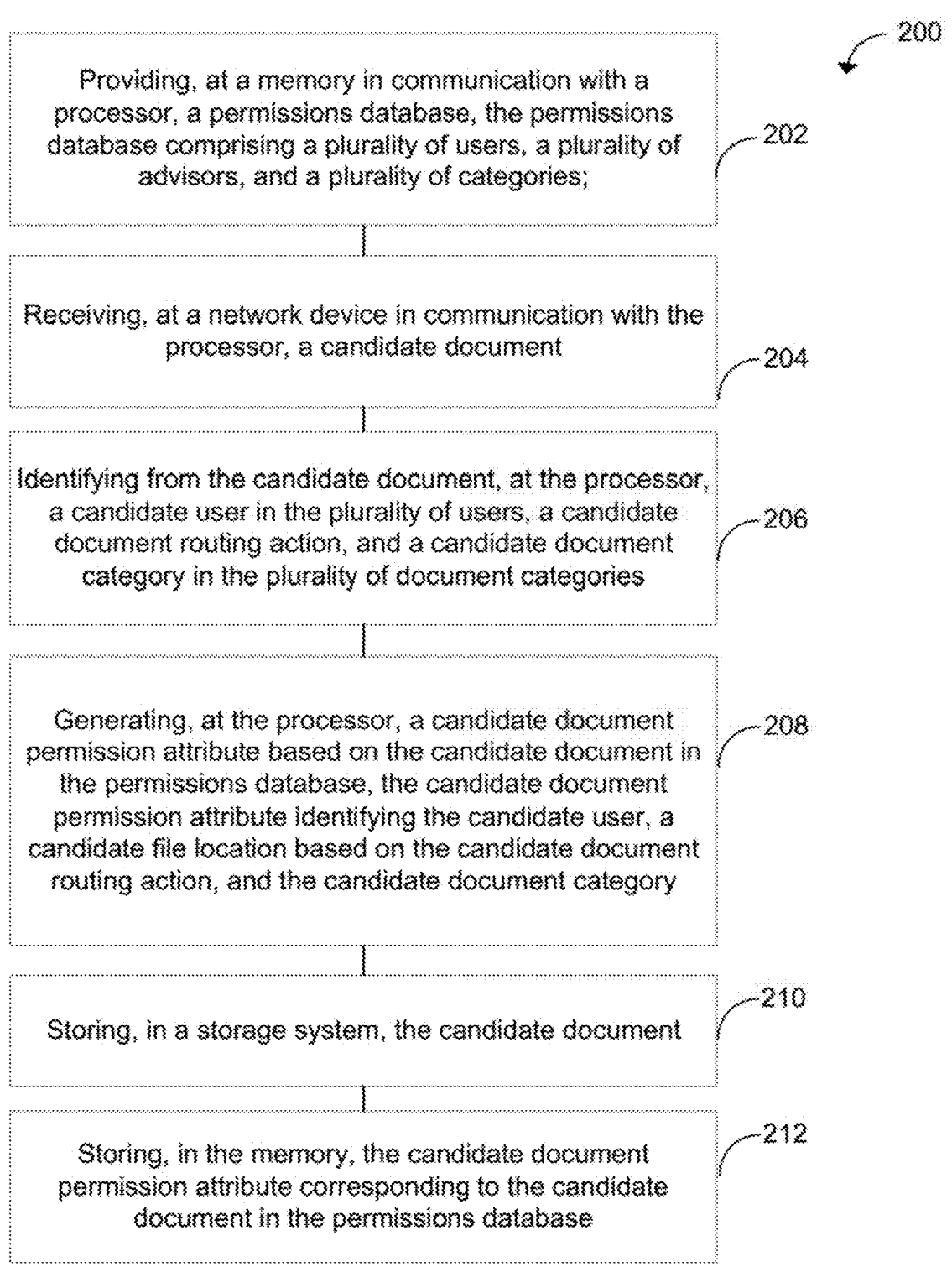

200

Providing, at a memory in communication with a processor, a permissions database, the permissions database comprising a plurality of users, a plurality of advisors, and a plurality of categories;

202

Receiving, at a network device in communication with the processor, a candidate document

204

Identifying from the candidate document, at the processor, a candidate user in the plurality of users, a candidate document routing action, and a candidate document category in the plurality of document categories

206

Generating, at the processor, a candidate document permission attribute based on the candidate document in the permissions database, the candidate document permission attribute identifying the candidate user, a candidate file location based on the candidate document routing action, and the candidate document category

208

Storing, in a storage system, the candidate document

210

Storing, in the memory, the candidate document permission attribute corresponding to the candidate document in the permissions database

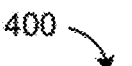
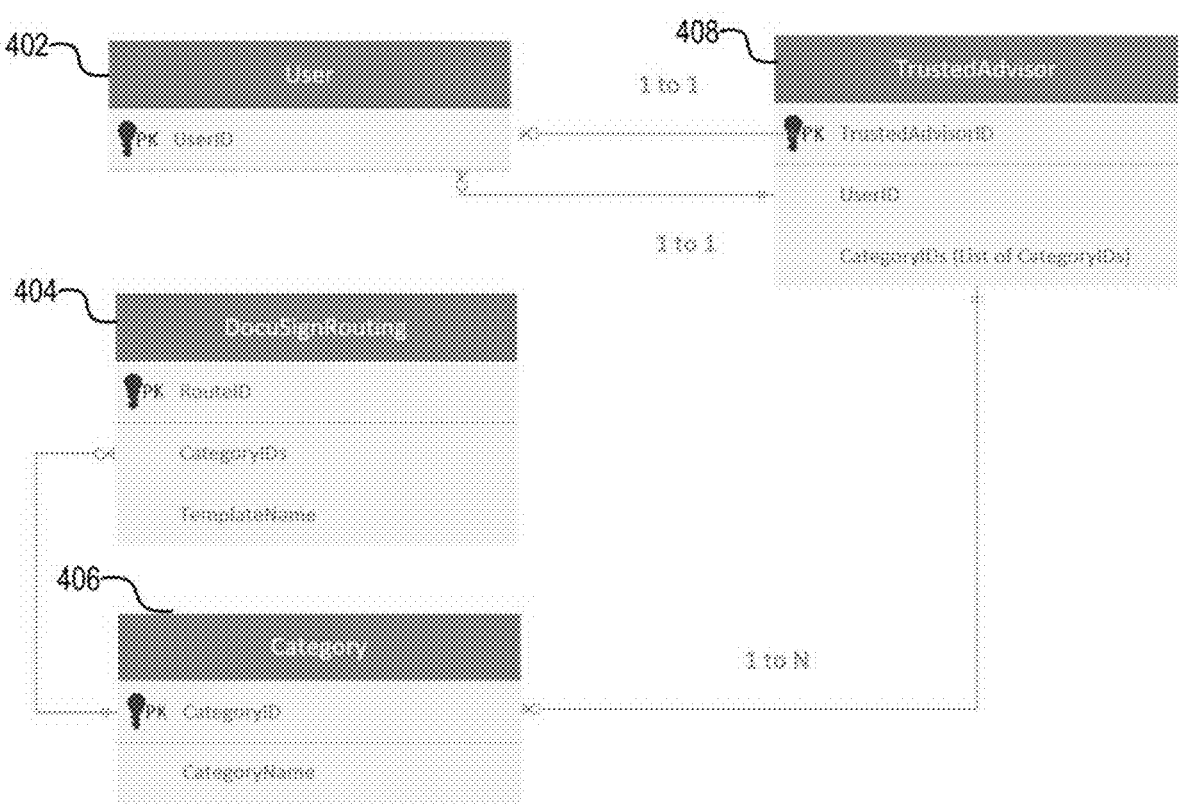
FIG. 4

SYSTEMS AND METHODS FOR DOCUMENT HIERARCHY PERMISSIONING

CROSS-REFERENCE TO RELATED APPLICATION

This application claims the benefit of U.S. Provisional Patent Application No. 63/225,659, filed Jul. 26, 2021, the entire content of which is incorporated herein by this reference.

FIELD

The described embodiments relate to electronic document management, and in particular systems, methods and computer readable media for assigning permissions to documents in a database.

BACKGROUND

People often use filing cabinets and file folders to store important documents. To make these filing systems useful, the folders and documents are generally organized and managed to make document retrieval convenient and easy. With electronic documents, databases with folder structures can be used to store documents. As with physical documents, organizing and managing the database aids in making documents easily retrievable. Managing electronic documents further introduces challenges of setting appropriate document permissions so that documents may be shared between users, and other trusted individuals such as trusted advisors.

Managing electronic document databases can be a tedious and time-consuming task. Because electronic documents are easy to create and disseminate, large numbers of documents may be filed in electronic databases. The increased number of documents often results in an increased number of file folders and potential file locations, and makes it difficult to automatically determine document permissions for sharing. As a result, individuals may neglect to share their documents, resulting in problems with shared documents that may be provided to associated users such as advisors. This may mean that an advisor user has to manually remind another user to share a particular document.

Another difficulty when managing electronic databases is that the documents may be created without predefined permission categories. For instance, document management systems, scanners and cameras may generate electronic documents with full permissions to all users. This makes it difficult for users to identify appropriate filing locations and document permissions for these documents.

In some cases, file storage may be provided to a user and shared between multiple advisor users associated with the user. This may cause challenges where information is not shared, or conversely, incorrectly shared with different advisor users. There exists a need for improved methods, systems, and computer readable media for providing automated document permissions associated with shared document storage.

SUMMARY

In a first aspect, some embodiments of the invention provide a method for determining the permissions of an electronic file, the method comprising: providing, at a memory in communication with a processor, a permissions database, the permissions database comprising a plurality of users, a plurality of advisors, and a plurality of categories; receiving, at a network device in communication with the processor, a candidate document; identifying from the candidate document, at the processor, a candidate user in the plurality of users, a candidate document routing action, and a candidate document category in the plurality of document categories; generating, at the processor, a candidate document permission attribute based on the candidate document in the permissions database, the candidate document permission attribute identifying the candidate user, a candidate file location based on the candidate document routing action, and the candidate document category; storing, in a storage system, the candidate document; and storing, in the memory, the candidate document permission attribute corresponding to the candidate document in the permissions database.

In one or more embodiments, the method may further comprise assigning a category permission to an advisor in the plurality of advisors, the category permission corresponding to a first document category in the plurality of categories.

In one or more embodiments, the method may further comprise: when the candidate document category matches the category permission of the candidate advisor, displaying, at a device of the candidate advisor, the candidate document.

In one or more embodiments, the candidate document category may be determined based on a classification from a machine learning model.

In one or more embodiments, the candidate document category may be determined based on a rule-based category model.

In one or more embodiments, the candidate document routing action may comprise a candidate organization of the candidate document.

In one or more embodiments, the candidate document category may further comprise a category identifier and a sub-category identifier.

In one or more embodiments, the category identifier and the sub-category-identifier may define the candidate file location within a file hierarchy.

In one or more embodiments, the candidate document may have a metadata item associated therewith, and the generating the candidate document category may be based on the candidate document and the metadata item.

In one or more embodiments, the candidate file location of each document permission may comprise a first level file location in a hierarchy of file locations.

In one or more embodiments, the candidate file location of each document permission may comprise a second level file location in a hierarchy of file locations.

In one or more embodiments, the identifying the candidate user may further comprise identifying the candidate user based on an email address determined from the candidate document.

In one or more embodiments, the identifying the candidate user may further comprise identifying the candidate user based on a signature determined from the candidate document.

In one or more embodiments, the identifying the candidate user may further comprise identifying the candidate user based on an XML element within the candidate document.

In one or more embodiments, the identifying the candidate user may further comprise: determining, at the processor, that the candidate user identified is a low-confidence match; and wherein the candidate document permission for the low-confidence match may comprise a temporary storage for the candidate document.

In one or more embodiments, the method may further comprise: receiving, at the processor, a user input corresponding to the candidate document in the temporary storage; and generating, at the processor, a user generated candidate document permission attribute based on the user input.

In one or more embodiments, the method may further comprise: determining, at the processor, that the candidate user does not correspond to a candidate user record in the permissions database; and generating, at the processor, a file storage vault for the candidate user, and a corresponding candidate user record for the candidate user.

In one or more embodiments, the candidate document may be received at the network device via an Application Programming Interface (API).

In one or more embodiments, the API is webhooks.

In a second aspect, there is provided a system for determining the permissions of an electronic file, the system comprising: a memory, the memory comprising: a permissions database, the permissions database comprising a plurality of users, a plurality of advisors, and a plurality of categories; a network device for receiving a candidate document; a storage system for storing documents; a processor in communication with the memory, the network device, and the storage system, the processor configured to: identify from the candidate document a candidate user in the plurality of users, a candidate document routing action, and a candidate document category in the plurality of document categories; generate a candidate document permission attribute based on the candidate document in the permissions database, the candidate document permission attribute identifying the candidate user, a candidate file location based on the candidate document routing action, and the candidate document category; store, in the storage system, the candidate document; and store, in the memory, the candidate document permission attribute corresponding to the candidate document in the permissions database.

In one or more embodiments, the processor may be further configured to: assign a category permission to an advisor in the plurality of advisors, the category permission corresponding to a first document category in the plurality of categories.

In one or more embodiments, the system may further comprise: a display device in communication with the processor, the display device for displaying the candidate document; and wherein the processor may be further configured to display the candidate document at the display device when the candidate document category matches the category permission of the candidate advisor.

In one or more embodiments, the candidate document category may be determined based on a classification from a machine learning model.

In one or more embodiments, the candidate document category may be determined based on a rule-based category model.

In one or more embodiments, the candidate document routing action may comprise a candidate organization of the candidate document.

In one or more embodiments, the candidate document category may further comprise a category identifier and a sub-category identifier.

In one or more embodiments, the category identifier and the sub-category-identifier may define the candidate file location within a file hierarchy.

In one or more embodiments, the candidate document may have a metadata item associated therewith, and the generating the candidate document category may be based on the candidate document and the metadata item.

In one or more embodiments, the candidate file location of each document permission may comprise a first level file location in a hierarchy of file locations.

In one or more embodiments, the candidate file location of each document permission may comprise a second level file location in a hierarchy of file locations.

In one or more embodiments, the identifying the candidate user may further comprise identifying the candidate user based on an email address determined from the candidate document.

In one or more embodiments, the identifying the candidate user may further comprise identifying the candidate user based on a signature determined from the candidate document.

In one or more embodiments, the identifying the candidate user may further comprise identifying the candidate user based on an XML element within the candidate document.

In one or more embodiments, the identifying the candidate user may further comprise: determining, at the processor, that the candidate user identified is a low-confidence match; and wherein the candidate document permission for the low-confidence match may comprise a temporary storage for the candidate document.

In one or more embodiments, the system may further comprise: a user input device in communication with the processor for receiving a user input corresponding to the candidate document in the temporary storage; wherein the processor may be further configured to generate a user generated candidate document permission attribute based on the user input.

In one or more embodiments, the processor may be further configured to:

determine that the candidate user does not correspond to a candidate user record in the permissions database; and generate a file storage vault for the candidate user and a corresponding candidate user record for the candidate user.

In one or more embodiments, the candidate document may be received at the network device via an Application Programming Interface (API).

In one or more embodiments, the API may be webhooks.

In a third aspect, there is provided a non-transitory computer-readable medium with instructions stored thereon for determining the permissions of an electronic file, that when executed by a processor, performs the methods described herein.

BRIEF DESCRIPTION OF THE DRAWINGS

A preferred embodiment of the present invention will now be described in detail with reference to the drawings, in which:

FIG. 2 shows an example document permission method diagram in accordance with one or more embodiments.

FIG. 4 shows an example entity-relationship diagram in accordance with one or more embodiments.

DESCRIPTION OF EXEMPLARY EMBODIMENTS

Figure 1:
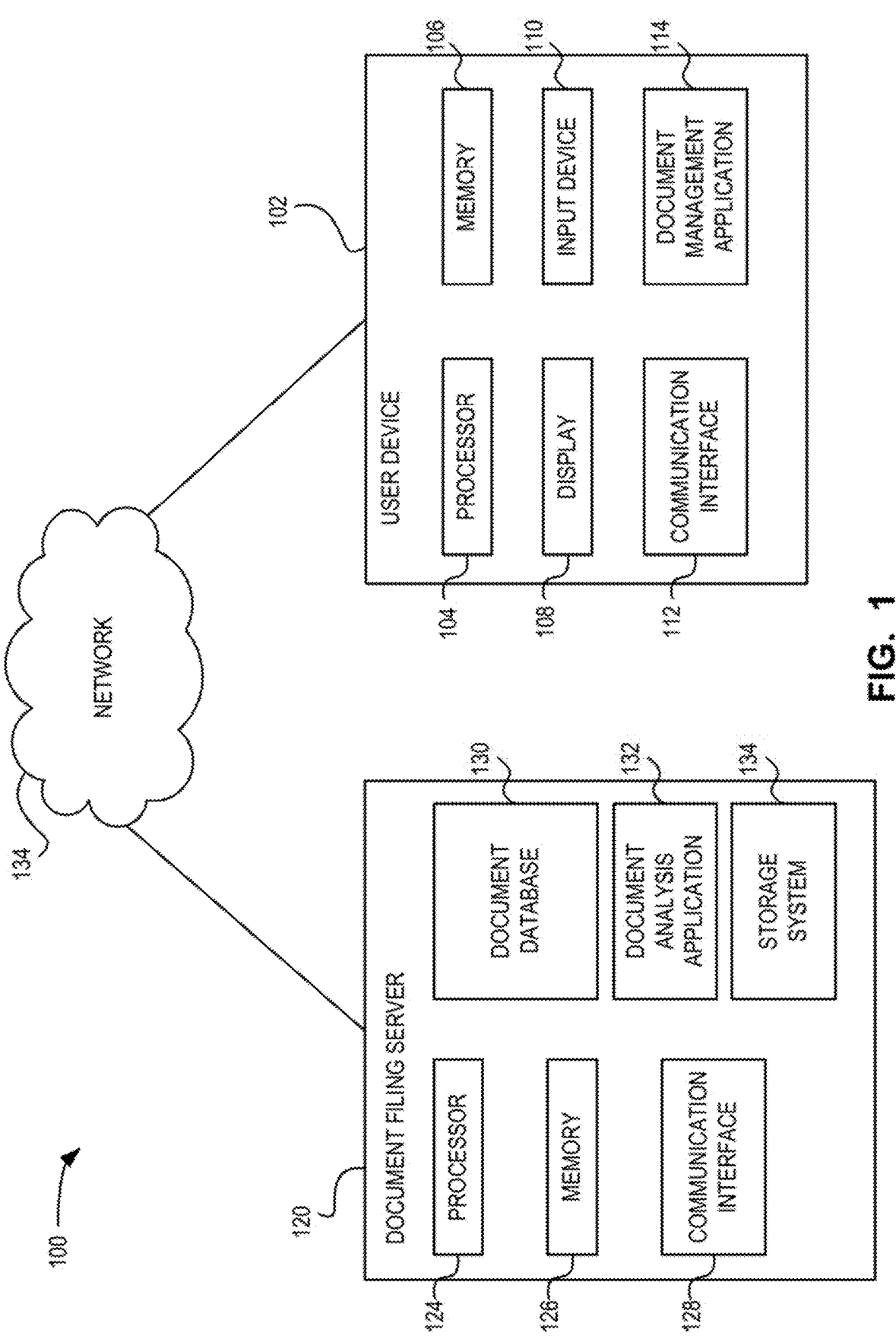
FIG. 1 shows an example document permission system diagram in accordance with one or more embodiments.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented such as hardware, software, and combinations thereof.

Program code may be applied to input data to perform the functions described herein and to generate output information. The output information is applied to one or more output devices, in known fashion.

Each program may be implemented in a high-level procedural or object-oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmissions or downloads, magnetic and electronic storage media, digital and analog signals, and the like. The computer useable instructions may also be in various forms, including compiled and non-compiled code.

Received files may be assigned a suggested filing location and recommended file name, as described in U.S. Pat. No. 10,884,979 which is incorporated herein by reference in its entirety.

Embodiments of the systems, methods and computer readable media described herein may facilitate filing and managing electronic documents in a database, including document permissions. In general, the embodiments described herein may provide for automatic ingestion, management and filing of one or more documents in a database having a plurality of file locations. In some embodiments, a cloud-based document management or bookkeeping system is provided. In some embodiments, access to the one or more documents may include access for a user and access for one or more associated users, such as advisor users.

The embodiments described herein may involve receiving one or more documents. The documents may be received in various formats, such as email attachments, documents uploaded and/or moved between computing devices or between applications on a computing device, and/or documents generated using scanners or digital cameras for example.

Manual approaches to document filing can be time consuming and may result in documents being filed without appropriate permissions. The embodiments described herein may provide a structured bookkeeping filing system that automates digital document storage to allow users to quickly and accurately store and organize their important documents digitally, including with appropriate document permissions.

The embodiments described herein may provide improved techniques for organizing, storing and sharing such received documents by automatically determining document permissions. The document permissions may include read permissions, write permissions, and other permissions. The document permissions may be for a file associated with a user, and may extend to organizations, groups of advisors, or other users. Document permissions may extend between different organizations, for example, a document may be visible to both a user of an associated accounting firm and a user of an associated law firm. The document permissions may be viewable and reviewable by a user to allow the user to view or change the permissions for a document. The document may have permissions automatically applied when the document is ingested.

Embodiments described herein may also generate recommended document permissions associated with a received file. In some cases, the recommended document permissions may be for newly created or received documents, or recommended modifications to existing permissions (e.g. where a user becomes associated with a new advisor or organization).

In some cases, files may be received that include multiple documents within a single file. These multi-document files may be separated into separate files for each document by grouping the pages in the file into distinct documents. The grouping can be done based on page markers derived from the pages in the document. The page markers may include image-based page markers derived from the visual appearance of the page. The page markers may also include text-based page markers determined from the text data in the file. These separate files may be assigned distinct permissions as required for each file.

To identify suggested document permissions, text data can be identified in a received document. For instance, if the document is an electronically created document, then the text data may be automatically identified because it is already in a format recognizable to the computing system. In other cases, e.g. where documents are scanned or generated by a digital camera, techniques such as optical character recognition may be used to identify the text data.

In some embodiments, once text data has been identified in a document, the text data can be indexed to identify one or more document keywords. Indexing the text data may include identifying a plurality of document keywords in the document text. The document keywords may be identified while excluding various commonly used words. For instance, articles may be excluded from being considered document keywords. The indexing may also include determining a word occurrence level. The word occurrence level may be an absolute number of times the word is present in the document. Alternatively, the word occurrence level may be a relative measure of how often the word is present in the document. The word occurrence level may be used to determine a permission category of a received document.

In some cases, words that are present in the document more than a keyword threshold number of times may be identified as document keywords. That is, the word occurrence level may need to meet the keyword threshold in order to be considered a document keyword. The keyword threshold may be determined based on the length of the document or other potential keywords in a document. In some cases, the keyword threshold may be an absolute keyword threshold, e.g., 5 or 10 times per page. In other cases, the keyword threshold may be a relative keyword threshold, e.g., the 5 or 10 most prevalent potential keywords.

The document keywords can be compared to a corpus of stored keywords. The corpus of stored keywords can be generated using documents previously stored in the database. For example, the corpus of stored keywords may include keywords determined from the permission category of previously stored documents and/or document keywords identified in previously stored documents. The corpus of stored keywords may also be determined from attributes of the database directory.

In some cases, the document permission category may be based on the document keywords, or the document keywords compared to the corpus of stored keywords.

For example, the corpus of stored keywords may include keywords determined from folder names and/or file location names, and existing permission categories. In some cases, the corpus of stored keywords may include user-defined keywords. A user may enter keywords to be associated with specific document permissions. In some cases, keywords may be automatically pre-populated into the corpus of keywords and associated with document permissions (e.g., the keyword "IRS" may be associated with permissions for a tax accountant advisor).

Each of the stored keywords in the corpus may have at least one document permission and a corresponding user, advisor or organization that identifies a document permission associated with that stored keyword. In some cases, a stored keyword may have two or more permission category associations identifying different document permissions. The permission category associations may be generated automatically, e.g. based on the document keywords, or document file name of documents previously filed to a particular permission category. In some cases, permission category associations may also be generated manually when user-defined keywords are entered by users to be associated with particular permission categories.

Based on the comparison of the one or more document keywords and the corpus, a plurality of keyword scores may be generated. The plurality of keyword scores may indicate relevance or a match between the document keywords in a particular document and one or more stored keywords in the corpus. The plurality of keyword scores may then be used to generate suggested document permission categories.

In some embodiments, documents and/or their text data may be input to an artificial intelligence (AI) or machine learning system, which can be trained to identify associations between portions of the text data and document permission categories, and to output suggested document permission categories following analysis of each document.

Figure 5:
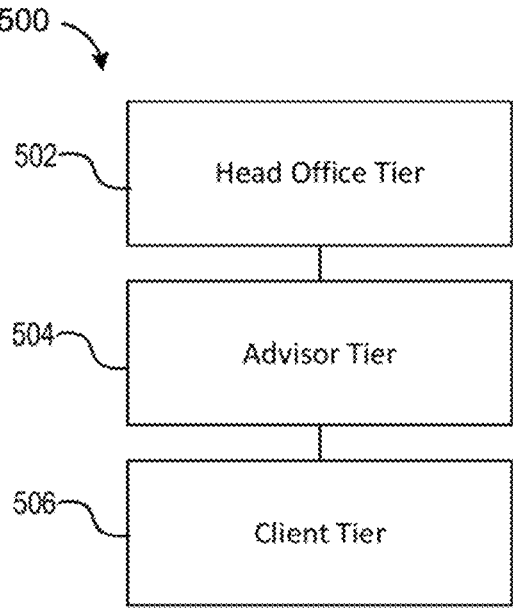
FIG. 5 shows an example permission category hierarchy diagram in accordance with one or more embodiments.

The machine learning system can be pre-trained using preset document permission categories or a hierarchy of document permissions (see e.g. FIG. 5). Such preset document permission conventions may in some cases consider multiple document permission conventions.

In some cases, documents may be automatically filed using suggested document permission categories. In other cases, a user may be prompted to approve the suggested document permission category or identify another document permission category before the document is stored. If a user chooses to defer selecting a document permission category, the document may be temporarily filed until a final document permission category is determined. A user may be periodically prompted to select or approve the document permission categories for which filing was deferred. In embodiments that use machine learning, user selections may be fed back to the local and master nodes to improve future prediction performance.

In embodiments that use a keyword corpus, the stored keywords in the corpus may have permission-category-specific weightings for each of their corresponding document permission associations. The permission-category-specific weightings may be used to generate the suggested document permission categories.

The permission-category-specific weightings may indicate the relevance of the stored keyword to a document permission category. That is, a document permission category may be given a higher permission-category-specific weighting when the stored keyword is more relevant to the particular permission category. For example, where multiple stored keywords are associated with a particular document permission category, the keywords may be scored and/or ranked to indicate the relevance of that keyword to the particular document permission category.

In other cases, the permission-category-specific weighting may be determined based on the document permission category. For example, the database may include a number of permission hierarchy levels (e.g. categories and subcategories). This is described in further detail at FIG. 5.

In some embodiments, a keyword coefficient may be determined for the document keywords identified in the text data. A keyword coefficient may indicate a measure of importance of the document keyword to the document. For example, the keyword coefficient may be determined using the word occurrence level of a keyword in the document. The plurality of keyword scores for a particular document may then be generated using the keyword coefficient. The keyword coefficient can also be used to identify important keywords indicative of a recommended document permission category.

In some embodiments, the importance of a document keyword within a document may be determined based on keyword text attributes of the document keyword. Keyword text attributes may include text location, text size, and text formatting for example. For example, the keyword text location may be determined based on the location or location(s) of the document keyword within the document. For example, text located near the beginning or top of a page may be identified as of greater importance than text further below in the page. Similarly, text size may be used to determine the importance of a document keyword within a document. Larger text may indicate keywords that are more important to the document. Text formatting, such as bolding or underlining may also indicate keywords that may be more important to a document.

In some cases, the document may be identified as a particular document type from a plurality of document types. The plurality of document types may be pre-populated in the system as template document types (e.g. common business forms, papers etc.). The plurality of document types can also be updated continuously as new documents and new document templates are stored in the system.

A plurality of document regions may be identified for a document type. For example, document regions may include title regions, header regions, footer regions, body regions, or other regions specific to document types. The document regions within the document may then be associated with a regional importance measure for the document type. For example, the title region of a document may be identified as a highly important region in various document types.

In other cases, other regions within the document may also be identified as being important. For example, a document type such as an income tax document may always have the same title but another region, such as a header region, may include text data that is more descriptive of the specific document. Accordingly, in such embodiments the header region may be identified as a highly important region in that document type.

The keyword coefficients for each of the document keywords in the text data can be determined based on the document region for that document keyword within the document. Document keywords present in one or more highly relevant regions of the document may have a greater keyword coefficient than other potential keywords that occur often, but in less important regions of the document.

The recommended document permission category may also be determined taking into account the relationship between previously stored permission categories and the text data within the corresponding documents. That is, a permission category convention may be determined based on text data from previously stored documents. For instance, if a previously stored document has a title document region and a date document region, and text data from those regions appears in the permission category, a similar naming convention may be used to automatically generate the recommended permission category.

In the embodiments described herein, determining suggested permission categories may simplify the task of filing a large number of electronic documents in a digital database or digital filing cabinet. The embodiments described herein may enable a user to more easily and rapidly identify one or more permission category for saving their business or personal documents that may facilitate later retrieval, either manually or automatically. Generating recommended permission categories may further facilitate the management of files, by providing a user with a one-click option for creating or modifying a permission category.

Reference is first made to FIG. 1, which shows an example document permission system 100 used for automatic filing of documents in accordance with one or more embodiments.

System 100 generally comprises a plurality of computers connected via data communication network 134, which itself may be connected to the Internet. As shown in FIG. 1, system 100 includes at least one user device 102 that is coupled to a document filing server 120 over network 134.

Typically, the connection between network 134 and the Internet may be made via a firewall server (not shown). In some cases, there may be multiple links or firewalls, or both, between network 134 and the Internet. Some organizations may operate multiple networks 134 or virtual networks 134, which can be internetworked or isolated. These have been omitted for ease of illustration, however it will be understood that the teachings herein can be applied to such systems. Network 134 may be constructed from one or more computer network technologies, such as IEEE 802.3 (Ethernet), IEEE 802.11 and similar technologies.

Computers and computing devices such as user device 102 and server 120 may be connected to network 134 or a portion thereof via suitable network interfaces. In some cases, the user device 102 may connect to server 120 using network 134 via the Internet. In other cases, the user device 102 may be directly linked to server 120, for example, via a Universal Serial Bus, Bluetooth™ or Ethernet connection.

The user device 102 may be a computer such as a smart phone, desktop or laptop computer, which can connect to network 134 via a wired Ethernet connection or a wireless connection. The user device 102 has a processor 104, a memory 106 that may include volatile memory and non-volatile storage, at least one communication interface 112, input devices 110 such as a keyboard and trackpad, output devices such as a display 108 and speakers, and various other input/output devices as will be appreciated. The user device 102 may also include computing devices such as a smartphone or tablet computer.

Processor 104 is a computer processor, such as a general-purpose microprocessor. In some other cases, processor 104 may be a field programmable gate array, application specific integrated circuit, microcontroller, or other suitable computer processor.

Processor 104 is coupled to display 108, which is a suitable display for outputting information and data as needed by various computer programs. In particular, display 108 may display graphical user interfaces (GUI). The user device 102 may execute an operating system, such as Apple iOS™, Microsoft Windows™, GNU/Linux, or other suitable operating system.

Communication interface 112 is one or more data network interface, such as an IEEE 802.3 or IEEE 802.11 interface, for communication over a network.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to user device 102 as carrying out a function or acting in a particular way imply that processor 104 is executing instructions (e.g., a software program/application) stored in memory 106 and possibly transmitting or receiving inputs and outputs via one or more interface. Memory 106 may also store data input to, or output from, processor 104 in the course of executing the computer-executable instructions.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

For instance, a document management application 114 may be stored on the user device 102. Although shown separately from memory 106, it will be understood that document management application 114 may be stored in memory 106. In general, the document management application 114 may provide a user of the user device 102 with user interfaces for interacting with and managing storage of documents in document database 130. While document management application 114 is shown as being provided on the user device 102, the document management application 114 may be provided as a cloud application accessible to the user device 102 over the Internet using network 134. The document management application 114 may communicate with a document analysis application 132 of server 120 to assist the server 120 in organizing and managing documents in the document database 130.

The server 120 may be a computer such as a desktop or server computer, which can connect to network 134 via a wired Ethernet connection or a wireless connection. The server 120 has a processor 124, a memory 126 that may include volatile memory and non-volatile storage, at least one communication interface 128, and a document database 130. The processor 124, memory 126, and communication interface 128 may be implemented in generally the same manner as with processor 104, memory 106, and communication interface 112 respectively.

Although shown as separate elements, it will be understood that database 130 may be stored in memory 126. Optionally, server 120 may include additional input or output devices, although this is not required. As with all devices shown in system 100, there may be multiple servers 120, although not all are shown. In some cases, server 120 may be distributed over a plurality of computing devices, for instance operating as a cloud server. As with user device 102, references to acts or functions by server 120 imply that processor 124 is executing computer-executable instructions (e.g., a software program) stored in memory 126.

As noted above, memory 126 may also store database 130. In some example embodiments, database 130 is a relational database. In other embodiments, database 130 may be a non-relational database, such as a key-value database, NoSQL database, a graph database, or the like. In some cases, database 130 may be formed from a mixture of relational and non-relational databases.

The user device 102 and document filing server 120 may have various additional components not shown in FIG. 1. For example, additional input or output devices (e.g., keyboard, pointing device, etc.) may be included beyond those shown in FIG. 1.

Data stored in the database 130 can be arranged into a file directory system with a plurality of file locations. The file directory system may include a plurality of folder levels, with high-level folders having one or more sub-folders that provide for more granular organization of files. Each file location in the plurality of file locations can be associated with a particular folder (and thus a particular folder level), and may also have secondary associations with each of the folders above that folder in a hierarchy. The folders and sub-folders may reflect categories and sub-categories used to organize documents. Although described as folder levels within a hierarchy, the files need not be stored in a hierarchical manner, and may instead merely have data attributes that may be indicative of a relative position in a logical hierarchy.

The data stored in the database 130, including directories and documents, may each have an associated permission category, as described in further detail in FIG. 4.

The server 120 may store a software application referred to herein as a document analysis application 132. Although shown separately from memory 126, it will be understood that document analysis application 132 may be stored in memory 126. The document analysis application 132 may be configured to analyze documents received by document filing server 120 to determine suggested file locations in database 130, and a document permission category (as described in FIG. 4). The document analysis application 132 may also be configured to identify and separate distinct documents within received files. The document analysis application 132 may also generate recommended file names for the document files, and recommended document permission categories.

While document analysis application 132 and document management application 114 are shown as separate applications, it will be understood that operations described as being performed by these applications may be performed by a single application operating on either the server 120 or user device 102, or such operations may be distributed between the user device 102 and server 120.

The document analysis application 132 may identify text data within received documents, for example using optical character recognition. The text data may be indexed and analyzed to identify document keywords. The document keywords can be compared against stored keywords such as folder names within the file directory structure, keywords associated with file locations and document keywords from text data of other previously saved documents to generate keyword scores. The document keywords may also be used in order to identify permission categories for the document. The keyword scores can be used to sort potential filing locations and assign permission category groups based on relevance rankings or best match, and then one or more of the potential permission categories can be displayed to the user as a suggested permission category for a document.

Computer vision and machine learning analysis can be applied to the text data to determine document keywords and recommended file names for the documents received by the system. Page markers, including image characteristics and text data markers, may be used to identify one or more distinct documents in a received file and to split the pages in the received file into the distinct documents.

Typically, the connection between network 134 and the Internet may be made via a firewall server (not shown). In some cases, there may be multiple links or firewalls, or both, between network 134 and the Internet. Some organizations may operate multiple networks 134 or virtual networks 134, which can be internetworked or isolated. These have been omitted for ease of illustration, however it will be understood that the teachings herein can be applied to such systems. Network 134 may be constructed from one or more computer network technologies, such as IEEE 802.3 (Ethernet), IEEE 802.11 and similar technologies.

The document analysis application 132 may provide an Application Programming Interface via communication interface 128 that third parties may communicate with. This may include transmitting and receiving files via the API from a third-party. For example, a banking organization or a tax organization may send and receive documents to the document analysis application 132 via communication interface 128.

Incoming files that are received at the API at document analysis application 132 may be associated with a user's assigned email address, or may be received via callback of an API by a service such as Docusign®. The document analysis application 132 may ingest the document, determine ownership information of a user in the document filing server 120, and may determine a document type based on a template name, or dynamically as described herein. Ownership information and the document type may be used to determine the permissions of one or more organizations (such as a financial organization), one or more advisors (such as the advisor from the financial organization), and the user. The incoming files at document analysis application 132 may be stored in document database 130. In some cases, the incoming files at document analysis application 132 may be stored in storage system 134 and a corresponding reference to the document or file may be stored in document database 130 including a storage system identifier.

The document analysis application 132 may automatically apply document permissions to documents as they are received. The document may be stored in a folder as a file within a file hierarchy, with associated folder or file permissions. The permissions can include a permission category that is associated with the file in the file hierarchy, as described in FIG. 4.

The document analysis application 132 may identify from the received document an associated user, a document routing action, and a document category. The user may be a new user, or an existing user stored in the document database 130.

The document analysis application 132 may generate a document permission attribute based on the received document. The document permission attributes may be generated and stored in the document database 130. The document permission attribute may identify a user associated with the received document, a file location, and the document category. The file location may be based on a document routing action.

The document analysis application 132 may assign a permission category that includes read permissions, write permissions, or management permissions to the files stored based on the documents received. The permission categories may include different tiers: such as a Head Office tier, an Advisor tier, and a Client Tier. For example, a particular tax document may belong to a tax permission category and may be viewable by a user and their tax accountant advisor (who are associated with the permission category), but the tax document may not be visible to other advisors that the user is associated with (e.g., a real estate lawyer who is not associated with the permission category). A user account may be created including a storage vault with an automatically assigned permission category in storage system 134 and document database 130. The automatically assigned permission category may link the "Advisor Tier" to the "Client Tier" to the user account and the storage vault. This may allow a financial institution to create a user account on document filing server 120 and automatically associate the created user account and vault with an advisor at the financial institution.

The document analysis application 132 may operate the method of FIG. 2 in order to automatically apply file permissions, including assigning a permission category to a received document.

The storage system 134 may be one or more storage devices at document filing server 120. The storage system 134 may be local to the document filing server 120. In other cases, the storage system 134 may be a cloud-based storage system such as Amazon® S3®. The incoming documents received at document analysis application 132 may be stored in the storage system 134 and a corresponding database record in document database 130 may be created that includes a storage system identifier corresponding to the location of the document storage on storage system 134.

Referring next to FIG. 2, there is shown an example method diagram 200 for determining the permissions of an electronic file in accordance with one or more embodiments. The method may be run by document analysis application 132 (see FIG. 1).

At 202, a permissions database is provided at a memory in communication with a processor, the permissions database comprising a plurality of users, a plurality of advisors, and a plurality of categories. The permissions database may include a plurality of users, a plurality of permission categories, a plurality of document permission attributes, a plurality of routing actions, and a plurality of received documents. The permissions database may be, for example, the document database 130 (see FIG. 1). The document database may include tables, constraints, and a schema that corresponds to the entity-relationship diagram in FIG. 4.

At 204, a candidate document is received at a network device in communication with the processor. The candidate document may be received at the document filing server 120 via a communication interface 128. The candidate document may be of many different types of formats, including Portable Document Format (PDF), Microsoft® Word .docx, or other common file formats as known. The candidate document may be a tax form received from a governmental organization such as the Canada Revenue Agency or the United States Internal Revenue Service (IRS). The candidate document may be a banking document received from a bank organization. The candidate document may be investment information from an investment brokerage. The candidate document may be legal information from a law firm, a court, or another legal organization. The candidate document may be delivered by an organization such as DocuSign®. The candidate document may include employment information, such as pay stubs, employment contracts, or other related documents.

At 206, a candidate user in the plurality of users is identified from the candidate document at the processor, a candidate document routing action, and a candidate document category in the plurality of document categories. The candidate user may have an existing user account in the database, or may be a new user. If the identified user of the received document is identified as a new user, a new user account may be created for the user. The candidate document routing action may include a template name and one or more permission categories. The candidate routing action may also be determined based on document text, as described herein.

At 208, a candidate document permission attribute is generated at the processor based on the candidate document in the permissions database, the candidate document permission attribute identifying the candidate user, a candidate file location based on the candidate document routing action, and the candidate document category. The candidate document permission attribute may correspond to the candidate document or file stored on the storage system.

At 210, the candidate document is stored in a storage system. For example, the candidate document may be stored in Amazon® S3®.

At 212, the candidate document permission attribute corresponding to the candidate document in the permissions database is stored in the memory.

In some cases, the method may further include: assigning a category permission to an advisor in the plurality of advisors, the category permission may correspond to a first document category in the plurality of categories.

In some cases, the method may further include: when the candidate document category matches the category permission of the candidate advisor, displaying, at a device of the candidate advisor, the candidate document.

In some cases, the candidate document category may be determined based on a classification from a machine learning model, while in some cases, the candidate document category may be determined based on a rule-based category model. In still other cases, both a machine learning model and a rule-based model may be used.

In some cases, the candidate document routing action may comprise a candidate organization of the candidate document.

In some cases, the candidate document category may further comprise a category identifier and a sub-category identifier.

In some cases, the category identifier and the sub-category identifier may define the candidate file location within a file hierarchy.

In some cases, the candidate document has a metadata item associated therewith, and the generating the candidate document category is based on the candidate document and the metadata item.

In some cases, the candidate file location of each document permission may comprise a first level file location in a hierarchy of file locations.

In some cases, the candidate file location of each document permission may comprise a second level file location in a hierarchy of file locations.

In some cases, the identifying the candidate user may further comprise identifying the candidate user based on an email address determined from the candidate document.

In some cases, the identifying the candidate user may further comprise identifying the candidate user based on a signature determined from the candidate document.

In some cases, the identifying the candidate user may further comprise identifying the candidate user based on an XML element within the candidate document.

In some cases, the identifying the candidate user may further comprise:

determining, at the processor, that the candidate user identified is a low-confidence match; and wherein the candidate document permission for the low-confidence match may comprise a temporary storage for the candidate document.

In some cases, the method may further comprise: receiving, at the processor, a user input corresponding to the candidate document in the temporary storage; and generating, at the processor, a user generated candidate document permission attribute based on the user input.

In some cases, the method may further comprise: determining, at the processor, that the candidate user does not correspond to a candidate user record in the permissions database; and generating, at the processor, a file storage vault for the candidate user, and a corresponding candidate user record for the candidate user.

In some cases, the candidate document may be received at the network device via an Application Programming Interface (API). In some cases, the API may be WebHooks.

Figure 3:
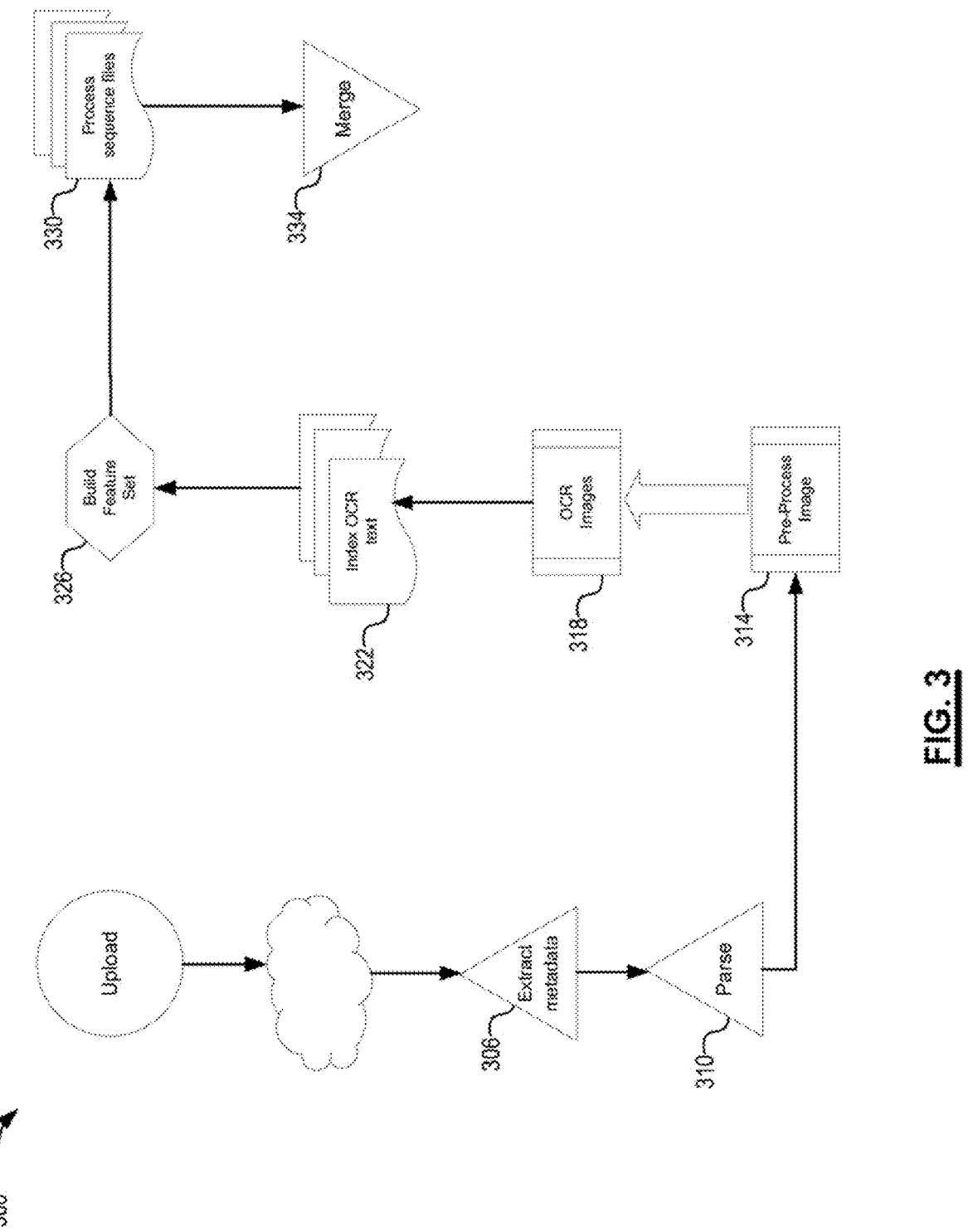
FIG. 3 shows another example document permission method diagram in accordance with one or more embodiments.

Referring next to FIG. 3, there is shown another example document permission method 300 for automatic ingestion of documents in accordance with one or more embodiments.

The process 300 begins at 302 with a third party transmitting, sending or uploading an electronic file to the document server 120. In the example shown in FIG. 3, the electronic file is a PDF document store.

Once the PDF document store is received, the document analysis application 132 can extract metadata from the received file at 306. The document analysis application 132 may also separate the PDF document into individual PDF pages using a burst operation. The individual PDF pages may then be parsed using a computer vision application such as OpenCV to identify image characteristics in each of the pages at 310. The computer vision application may identify artifacts or page characteristics which may subsequently be used to identify pages corresponding to the same document, for example using Hough transforms. One example of such an artifact may be staple marks. Other image characteristics may include page orientation, text angle, color, density and so forth.

The image characteristics may then be used to pre-process the received pages at 314. For example, image processing applications such as ImageMagick® may be used to pre-process the received pages. Once the pages have been pre-processed, text data may be identified in the pages at 318. The text data may be used by a routing action in order to route the document. The text data may be used in order to identify a candidate user corresponding to the document. The text data may be used in order to generate a document permission attribute for the document, or a permission category for the document. Where the received pages do not already have identifiable text data, optical character recognition may be performed using applications such as Tesser-act-ocr.

Once identified, the text data may be used to build a feature set, or feature vectors at 326.

In some embodiments, the text data may then be indexed to identify document keywords. The text data may be indexed using indexing applications such as Apache Solr™. The image characteristics identified in the received pages may similarly be indexed.

The indexed data for each page can be used to generate feature vectors for that page. These feature vectors may then be used to generate a page characteristic index using an application such as Apache Lucene™ and/or Elasticsearch™. The page characteristic indexes for each page can then be classified, e.g. using Bayesian classifiers in Apache Mahout™ to identify pages corresponding to the same distinct documents at 430. The corresponding pages may then be merged into distinct documents files based on the classification.

In some other embodiments, indexing of text data to identify document keywords may be omitted, and the raw text data may be input directly to the nodes of the machine learning system to generate feature vectors for the raw text data and to perform the classification at 430.

Referring next to FIG. 4, there is shown an example entity-relationship 400 for document permissions in accordance with one or more embodiments. The entity relationship 400 for document permissions can include a plurality of users 402, a plurality of trusted advisors 408, a plurality of document routing actions 404, and a plurality of permissions categories 406. The plurality of users 402, the plurality of document routing actions 404, and the plurality of permission categories 406, and the plurality of trusted advisors 408 may be stored in a database such as a NoSQL database (example, MongoDB®).

Document permissions may be assigned for a document to a user 402 and trusted advisor 408 using a permission category 406.

A document received by the document filing server 120 and processed by the document analysis application 132 may be processed using a document routing action 404 such as a DocuSignRouting action. The document received by document filing server 120 may include a document and document metadata, for example, in an XML format from DocuSign®. The document routing action 404 may determine the document type as described herein, and determine if routing should be performed on the received document. If routing is performed, it may include provisioning a new user account and file storage if the received document corresponds to a user 402 not present in the database. If routing is performed, it may include provisioning a new trusted advisor account 408 if the received document corresponds to a trusted advisor not present in the database.

The document routing action 404 may include a document routing action identifier, at least one category identifier, and a matching routing criteria such as TemplateName. The matching criteria of the routing action may identify a DocuSign Template Name, or as described herein, may include a matching text pattern. The matching criteria may also be driven by a machine learning model as described herein. The document routing action 404 may be selected from many different routing actions when a received document matches the routing criteria. If the matching criteria determine that the received document matches, the document routing action 404 is executed and permission categories may be applied to the document. Many routing actions 404 may identify documents as associated with a single permission category 406. A routing action 404 may identify a plurality of permission categories 406 which may be associated with a matching received document.

Each permission category 406 may include permission category name and a category identifier. The document routing action 404 may route a received document, and create a document permission category 406 attribute with the received document. This attribute may be stored in a table in the database. The permission attribute may be used by the system in order to determine read and write permissions for a user or trusted advisor.

The document permission categories 406 may be associated with files or folders in the form of a document permission attribute.

Each trusted advisor 408 may have a trusted advisor identifier, at least one user identifier which the trusted advisor is associated with, and at least one permission category identifier. The trusted advisor identifier may correspond to the user identifier of a user 402, associating the user authentication information for the trusted advisor 408.

Each trusted advisor 408 may be associated with at least one user 402 by way of at least one user identifier. Thus, each trusted advisor record 408 may identify at least one user 402 that the trusted advisor is responsible for advising. Each trusted advisor 408 may have at least one associated permission category identifier which may identify at least one permission category 406 for which the trusted advisor has been granted the relevant permission. Each user 402 can have many different trusted advisors 408, including for the same permission category 406 or for different permission categories 406. A trusted advisor 408 may be granted their role as "advisor" for the user automatically at the time the user record 402 is created, or it may be granted later on. A trusted advisor 408 may have their role as "advisor" revoked by the user at a later time, for example, if the user switches advisors to a competing advisor.

The granting of permission categories 406 to the trusted advisors 408 may be performed automatically at the time the trusted advisor 408 is created, automatically on receipt of a document corresponding to a permission category associated with the trusted advisor 408, or may be created or granted later on. An assigned permission category 406 of a trusted advisor 408 may similarly be revoked at a later date by removing the revoked category identifier from the trusted advisor record 408.

Each user record 402 may have a user identifier, and may include other information necessary for user authentication. A user who is also a trusted advisor 408 may have a corresponding trusted advisor record 408.

Referring next to FIG. 5, there is shown an example permission category hierarchy 500 in accordance with one or more embodiments. The permission category hierarchy 500 may have a plurality of tiers. For example, as shown, there may be a head office tier 502, an advisor tier 504, and a client tier 506. A trusted advisor may be granted a permission category at any of the tiers as required.

A head office advisor of a financial institution who has been granted a head office tier permission category 502 may have broad access to the corresponding documents found in a plurality of users file storage. This may allow for broader reporting and compliance reviews to be conducted as required by compliance officers at a head office of an organization. The head office tier 502 may have an association with one or more advisor tier permission categories 504. In this manner, the head office tier permission categories 502 may provide permissions which supersede a document permission category that is assigned to a document if that document is in the one or more advisor tier permission categories 504 which are associated with that head office tier permission category 502.

Another advisor who advises a set of client users may be granted an advisor tier permission category 504 and may have limited access to documents in that advisor tier permission category 504 of the users associated with that advisor. The advisor tier permission category 504 may have an association with one or more client tier permission categories 506. In this manner, the advisor tier permission categories 504 may supersede a document permission category that is assigned to a document if that document is in the one or more client tier permission categories 506 which are associated with that head office tier permission category 502.

Another user who shares one or more documents with another user may grant a client tier permission category 506. The client tier permission categories 506 may exist as between users of the document management system.

The present invention has been described herein by way of example only. Various modification and variations may be made to these exemplary embodiments without departing from the spirit and scope of the invention, which is limited only by the appended claims.

We claim:

1. A system for determining the permissions of an electronic file, the system comprising:

a memory, the memory comprising:

a permissions database, the permissions database comprising a plurality of users, a plurality of advisors, and a plurality of categories;

a network device for receiving a candidate document;

a storage system for storing documents;

a processor in communication with the memory, the network device, and the storage system, the processor configured to:

identify from the candidate document a candidate user in the plurality of users, a candidate document routing action, and a candidate document category in the plurality of document categories, wherein the candidate user is identified based on an electronic signature or an XML element determined from the candidate document, and wherein the candidate document routing action comprises a matching routing criteria;

evaluate metadata of the candidate document using the matching routing criteria;

responsive to the metadata of the candidate document matching the matching routing criteria, execute the candidate document routing action;

generate a candidate document permission attribute based on the candidate document in the permissions database, the candidate document permission attribute identifying the candidate user, a candidate file location based on the candidate document routing action, and the candidate document category;

store, in the storage system, the candidate document; and store, in the memory, the candidate document permission attribute corresponding to the candidate document in the permissions database.

2. The system of claim 1, wherein the processor is further configured to:

assign a category permission to an advisor in the plurality of advisors, the category permission corresponding to a first document category in the plurality of categories.

3. The system of claim 2 further comprising:

a display device in communication with the processor, the display device for displaying the candidate document; and wherein the processor is further configured to display the candidate document at the display device when the candidate document category matches the category permission of the candidate advisor.

4. The system of claim 1, wherein the candidate document category is determined based on a classification from a machine learning model.

5. The system of claim 1, wherein the candidate document category is determined based on a rule-based category model.

6. The system of claim 1, wherein the candidate document routing action comprises a candidate organization of the candidate document.

7. The system of claim 1, wherein the candidate document category further comprises a category identifier and a sub-category identifier.

8. The system of claim 1, wherein the category identifier and the sub-category-identifier define the candidate file location within a file hierarchy.

9. The system of claim 1, wherein the candidate document has a metadata item associated therewith, and the generating the candidate document category is based on the candidate document and the metadata item.

10. The system of claim 1, wherein the candidate file location of each document permission comprises a first level file location in a hierarchy of file locations.

11. The system of claim 1, wherein the candidate file location of each document permission comprises a second level file location in a hierarchy of file locations.

12. The system of claim 1, wherein the identifying the candidate user further comprises identifying the candidate user based on an email address determined from the candidate document.

13. The system of claim 1, wherein the identifying the candidate user further comprises:

determining, at the processor, that the candidate user identified is a low-confidence match; and wherein the candidate document permission for the low-confidence match comprises a temporary storage for the candidate document.

14. The system of claim 1, further comprising:

a user input device in communication with the processor for receiving a user input corresponding to the candidate document in the temporary storage;

wherein the processor is further configured to generate a user generated candidate document permission attribute based on the user input.

15. The system of claim 1, wherein the processor is further configured to:

determine that the candidate user does not correspond to a candidate user record in the permissions database; and generate a file storage vault for the candidate user, and a corresponding candidate user record for the candidate user.

16. The system of claim 1, wherein the candidate document is received at the network device via an Application Programming Interface (API).

17. A method for determining the permissions of an electronic file, the method comprising:

providing, at a memory in communication with a processor, a permissions database, the permissions database comprising a plurality of users, a plurality of advisors, and a plurality of categories;

receiving, at a network device in communication with the processor, a candidate document;

identifying from the candidate document, at the processor, a candidate user in the plurality of users, a candidate document routing action, and a candidate document category in the plurality of document categories;

generating, at the processor, a candidate document permission attribute based on the candidate document in the permissions database, the candidate document permission attribute identifying the candidate user, a candidate file location based on the candidate document routing action, and the candidate document category, wherein the candidate user is identified based on an electronic signature or an XML element determined from the candidate document, and wherein the candidate document routing action comprises a matching routing criteria;

evaluating metadata of the candidate document using the matching routing criteria;

responsive to the metadata of the candidate document matching the matching routing criteria, executing the candidate document routing action;

storing, in a storage system, the candidate document; and storing, in the memory, the candidate document permission attribute corresponding to the candidate document in the permissions database.

18. A non-transitory computer-readable medium with instructions stored thereon for determining the permissions of an electronic file, that when executed by a processor, performs the method of claim 17.

* * * * *